US012637841B2

(12) United States Patent
Mathew et al.

(10) Patent No.: US 12,637,841 B2
(45) Date of Patent: May 26, 2026

(54) MOUNTING SYSTEM FOR WORK MACHINE

(71) Applicant: Caterpillar Inc., Peoria, IL (US)

(72) Inventors: Shawn Nainan Mathew, Savoy, IL (US); Arthur Milkowski, Oro Valley, AZ (US); John Michael Plouzek, Peoria, IL (US); Norman Keith Lay, Baden, PA (US); Subhani Mahaboob Shaik, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 912 days.

(21) Appl. No.: 17/806,106

(22) Filed: Jun. 9, 2022

(65) Prior Publication Data

US 2023/0399820 A1 Dec. 14, 2023

(51) Int. Cl.
*E02F 9/26* (2006.01)
*F16M 13/02* (2006.01)

(52) U.S. Cl.
CPC ............. *E02F 9/264* (2013.01); *F16M 13/02* (2013.01)

(58) Field of Classification Search
CPC . E02F 9/264; E02F 9/261; E02F 9/205; E02F 3/32; F16M 13/02; F16M 11/046; F16M 11/045; G01D 11/30; B60R 11/04
See application file for complete search history.

(56) References Cited

U.S. PATENT DOCUMENTS

| | | | | |
|---|---|---|---|---|
| 6,470,606 | B1 * | 10/2002 | Nagahiro | E02F 9/26 |
| | | | | 37/348 |
| 8,411,930 | B2 | 4/2013 | Ridley et al. | |
| 9,030,332 | B2 | 5/2015 | Tafazoli et al. | |
| 10,011,976 | B1 | 7/2018 | Forcash et al. | |
| 10,106,072 | B2 * | 10/2018 | Liñan | B60Q 1/085 |
| 10,907,326 | B2 | 2/2021 | Olsen et al. | |
| 2010/0245542 | A1 * | 9/2010 | Kim | G01B 11/00 |
| | | | | 37/444 |
| 2020/0018045 | A1 * | 1/2020 | Sano | G06T 7/593 |
| 2020/0032487 | A1 * | 1/2020 | Zieser | E02F 9/0858 |
| 2020/0407952 | A1 * | 12/2020 | Yamanaka | E02F 3/435 |

FOREIGN PATENT DOCUMENTS

| | | | | | |
|---|---|---|---|---|---|
| JP | 2000129722 | A | * | 5/2000 | E02F 9/264 |
| WO | 2015088396 | | | 6/2015 | |
| WO | WO-2015088396 | A1 | * | 6/2015 | G01D 11/30 |

* cited by examiner

*Primary Examiner* — Nicole Coy
*Assistant Examiner* — Blake E Scoville

(57) ABSTRACT

A mounting system for a work machine includes a first member extending along a vertical axis of the mounting system, and a second member extending along the vertical axis and spaced apart from the first member along a lateral axis of the mounting system. The mounting system also includes a bracket assembly extending between the first member and the second member. The bracket assembly is disposable at a location along the vertical axis based on a removable coupling of the bracket assembly with each of the first member and the second member. The mounting system further includes an imaging device coupled with the bracket assembly. A position of the imaging device is adjustable with respect to the lateral axis of the mounting system and the vertical axis, such that a portion of a work implement of the work machine lies in a field of view of the imaging device.

20 Claims, 9 Drawing Sheets

MOUNTING SYSTEM FOR WORK MACHINE

TECHNICAL FIELD

The present disclosure relates to a mounting system for a work machine.

BACKGROUND

A work machine generally includes a work implement for performing one or more work operations at a worksite. Typically, the work implement is lowered or raised by an operator seated within an operator cabin. Due to interaction with ground surfaces, the work implements may be subjected to wear and tear. In some cases, one or more components of the work implement, such as, ground engaging elements, may have to be monitored by an imaging device for determining a current state or condition of such components. Images generated by the imaging device may be used to determine if one or more portions of the work implement require servicing or replacement.

The imaging device may be mounted on a mounting bracket. The mounting bracket may in turn be mounted on a portion of the work machine. Conventional mounting brackets and imaging devices may not provide clear and consistent visuals of a region of interest (such as, ground engaging elements) of the work implement. Further, the imaging device may not be adjustable so that the region of interest of the work implement lies in a field of view of the imaging device. Moreover, due to limited flexibility offered by conventional mounting brackets, the imaging device may not be able to capture images from different perspectives.

U.S. Pat. No. 10,106,072 describes a work vehicle having an optical system responsive to implement movements. The implement-responsive optical system includes an optical device, such as a work light or camera, which is coupled to the vehicle body, and which produces an optical field when active. An adjustment mechanism, such as a closed loop actuation subsystem or a mechanical linkage, is coupled to the vehicle body and to the optical device. The adjustment mechanism is configured to adjust at least one operational characteristic of the optical field in response to movement of the work implement relative to the vehicle body.

SUMMARY OF THE DISCLOSURE

In an aspect of the present disclosure, a mounting system for a work machine is provided. The mounting system includes a first member extending along a vertical axis of the mounting system. The mounting system also includes a second member extending along the vertical axis and spaced apart from the first member along a lateral axis of the mounting system. The mounting system further includes a bracket assembly extending between the first member and the second member proximate to a first end of the mounting system. The bracket assembly is disposable at a plurality of locations along the vertical axis based on a removable coupling of the bracket assembly with each of the first member and the second member. The mounting system includes an imaging device coupled with the bracket assembly. A position of the imaging device is adjustable with respect to at least one of the lateral axis of the mounting system and the vertical axis, such that at least one portion of a work implement of the work machine lies in a field of view of the imaging device.

In another aspect of the present disclosure, a work machine is provided. The work machine includes a frame. The work machine also includes a linkage assembly coupled with the frame. The linkage assembly includes a linkage member. The work machine further includes a work implement movably coupled with the linkage assembly. The work machine includes a mounting system coupled with the linkage member. The mounting system includes a first member extending along a vertical axis of the mounting system. The mounting system also includes a second member extending along the vertical axis and spaced apart from the first member along a lateral axis of the mounting system. The mounting system further includes a bracket assembly extending between the first member and the second member proximate to a first end of the mounting system. The bracket assembly is disposable at a plurality of locations along the vertical axis based on a removable coupling of the bracket assembly with each of the first member and the second member. The mounting system includes an imaging device coupled with the bracket assembly. A position of the imaging device is adjustable with respect to at least one of the lateral axis of the mounting system and the vertical axis, such that at least one portion of the work implement of the work machine lies in a field of view of the imaging device.

Other features and aspects of this disclosure will be apparent from the following description and the accompanying drawings.

DETAILED DESCRIPTION

Wherever possible, the same reference numbers will be used throughout the drawings to refer to the same or like parts.

Figure 1:
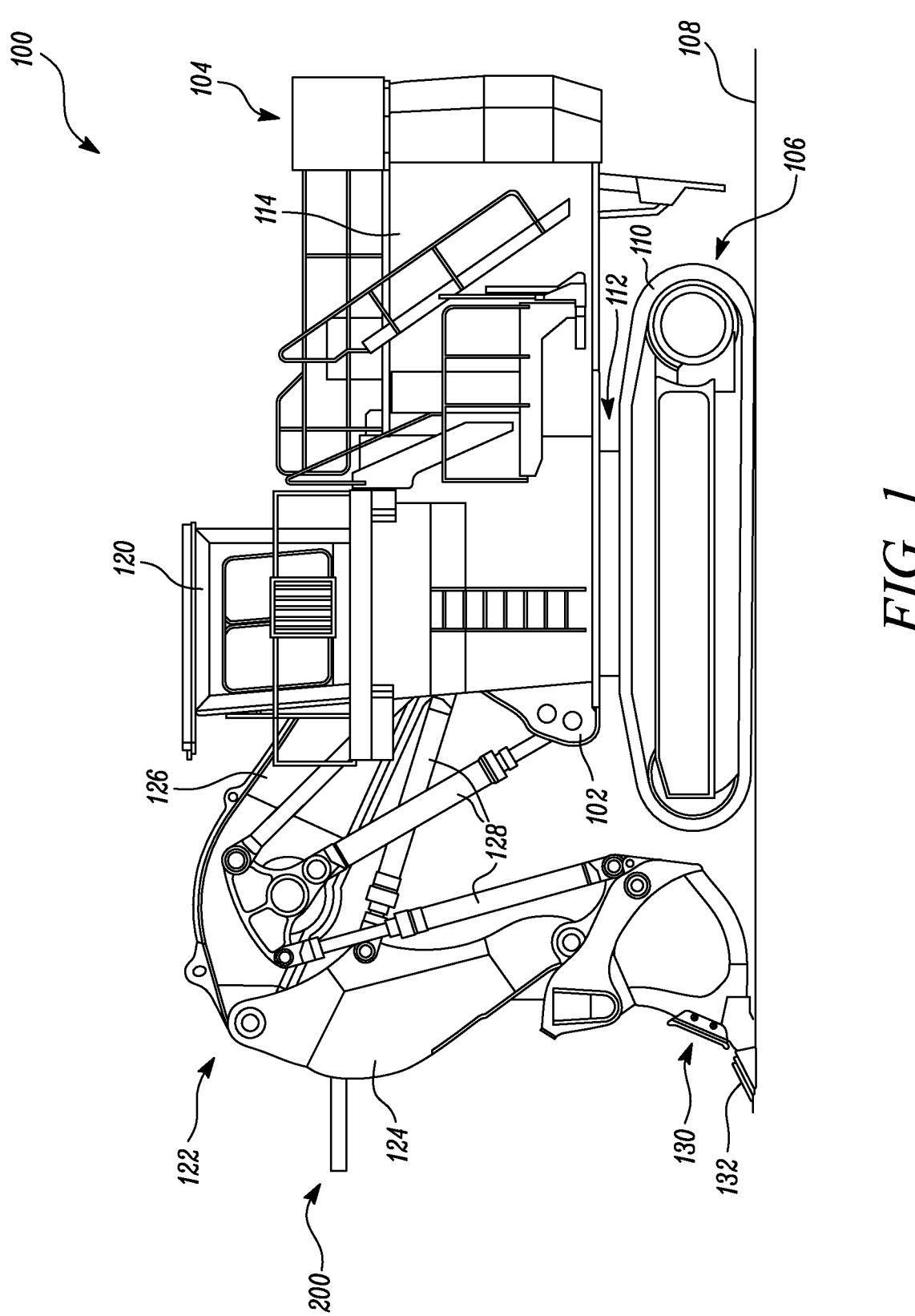
FIG. 1 is a schematic side view of a work machine including a mounting system, according to an embodiment of the present disclosure.

Referring to FIG. 1, a schematic side view of an exemplary work machine 100 is illustrated. In the illustrated embodiment of FIG. 1, the work machine 100 is a hydraulic mining shovel. However, the work machine 100 may include any other machine having a work implement, without any limitations. The work machine 100 may perform one or more work operations associated with an industry, such as, mining, construction, farming, transportation, or any other industry known in the art. In an example, the work machine 100 may perform the one or more work operations such as carrying aggregates from a location at a worksite, or scooping aggregates from the worksite.

The work machine 100 includes a frame 102. The work machine 100 also includes a superstructure (or upper carriage) 104, such that the frame 102 is defined by the superstructure 104. The work machine 100 further includes an undercarriage 106. The undercarriage 106 includes a pair of ground engaging devices 110 for propelling the work machine 100 on a ground surface 108. For example, the ground engaging devices 110 are embodied as tracks 110 herein. Alternatively, the ground engaging devices 110 may include wheels.

A slewing gear device (swing gear device) 112 is mounted to the superstructure 104 and the undercarriage 106 to enable a relative rotary movement to occur between the superstructure 104 and the undercarriage 106. The work machine 100 further includes a power module 114 that may provide operating power to various components of the work machine 100 for operational and mobility requirements. The power module 114 may include an engine (such as, an internal combustion engine), a battery, and the like. Further, the work machine 100 includes an operator cabin 120 supported by the frame 102. The operator cabin 120 may include one or more controls (not shown), such as, joysticks, pedals, levers, buttons, switches, knobs, audio visual devices, operator consoles, a steering wheel, and the like. The controls may enable the operator to control the work machine 100 during operation.

The work machine further includes a linkage assembly 122 coupled with the frame 102. The linkage assembly 122 includes one or more linkage members 124, 126. In the illustrated embodiment of FIG. 1, the linkage member 124 includes a stick and the linkage member 126 includes a boom. The linkage member 124 is pivotally coupled to the linkage member 126. Further, the linkage member 126 may be pivotally coupled to the superstructure 104. The work machine 100 further includes a work implement 130 movably coupled with the linkage assembly 122. Specifically, the work implement 130 is movably coupled to the linkage member 124. In the illustrated embodiment of FIG. 1, the work implement 130 is embodied as a face shovel. However, in other embodiments, the work machine 100 may include any other type of work implement, such as, a blade, a bucket, and the like, without any limitation. The work implement 130 includes a number of ground engaging elements 132 that engage with the ground surface 108. The ground engaging elements 132 may include cutting tools or tips. Further, one or more hydraulic actuators 128 may be coupled between the superstructure 104, the linkage assembly 122, and the work implement 130, for operating the work implement 130.

The present disclosure is related to a mounting system 200 for the work machine 100. Specifically, the work machine 100 includes the mounting system 200 coupled with the one or more linkage members 124, 126. The mounting system 200 may be used to monitor and generate images (such as, an image 264 shown in FIG. 3) of the work implement 130. In the illustrated embodiment of FIG. 1, the mounting system 200 is removably coupled with the linkage member 124. However, it may be contemplated that the mounting system 200 may be removably coupled to the linkage member 126. The structure of the mounting system 200 will now be described in detail with reference to FIG. 2.

Figure 2:
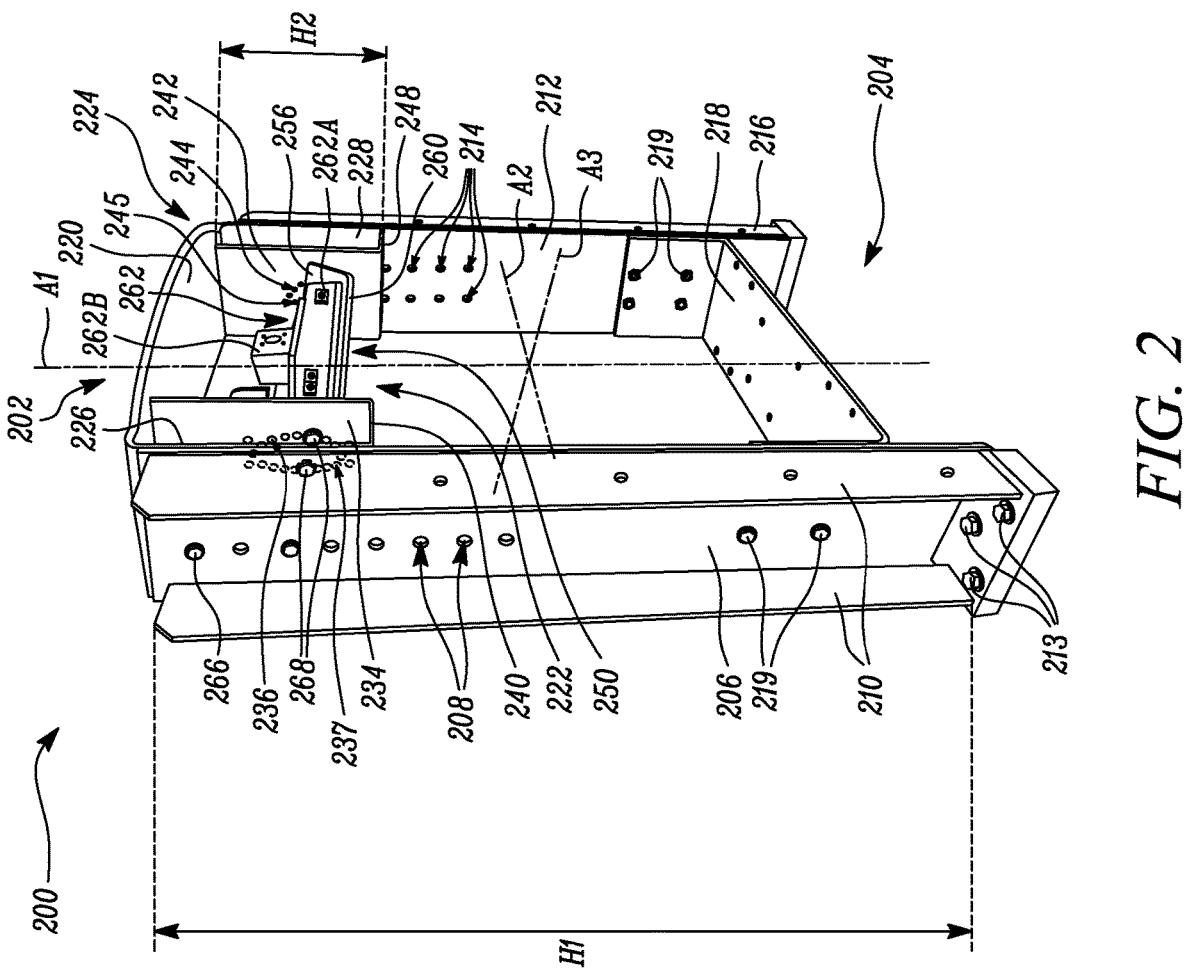
FIG. 2 is a perspective view of the mounting system of FIG. 1.

Referring to FIG. 2, a perspective view of the mounting system 200 for the work machine 100 (see FIG. 1) is illustrated. The mounting system 200 defines a vertical axis "A1", a lateral axis "A2" normal to the vertical axis "A1", and a longitudinal axis "A3" perpendicular to the vertical axis "A1" and the lateral axis "A2". The mounting system 200 defines a first end 202. The mounting system 200 also defines a second end 204. The second end 204 is opposite the first end 202. When the mounting system 200 is coupled to the linkage member 124 (see FIG. 1), the second end 204 is proximate to the linkage member 124 and the first end 202 is distal from the linkage member 124.

The mounting system 200 includes a first member 206 extending along the vertical axis "A1" of the mounting system 200. The first member 206 includes a number of first openings 208 linearly spaced apart from each other along the vertical axis "A1". In the illustrated embodiment of FIG. 2, the first member 206 includes two rows of first openings 208 disposed adjacent to each other along the longitudinal axis "A3". Further, the first member 206 includes a generally L-shaped structure. Moreover, a pair of plates 210 are coupled to the L-shaped structure of the first member 206. The plates 210 may improve a sturdiness of the first member 206.

The mounting system 200 also includes a second member 212 extending along the vertical axis "A1" and spaced apart from the first member 206 along the lateral axis "A2" of the mounting system 200. The second member 212 includes a number of second openings 214 linearly spaced apart from each other along the vertical axis "A1". Each first opening 208 in the first member 206 is in alignment with a corresponding second opening 214 in the second member 212. In the illustrated embodiment of FIG. 2, the second member 212 includes two rows of second openings 214 disposed adjacent to each other along the longitudinal axis "A3". Further, the second member 212 includes a generally L-shaped structure. Moreover, a pair of plates 216 (only one of which is shown herein) are coupled to the L-shaped structure of the second member 212. The plates 216 may improve a sturdiness of the second member 212.

Further, each of the first member 206 and the second member 212 define a first height "H1". The first height "H1" is defined along the vertical axis "A1". Moreover, each of the first and second members 206, 212 are coupled with the linkage member 124 associated with the work implement 130 (see FIG. 1) proximate to the second end 204 of the mounting system 200. In an example, the first and second members 206, 212 may be coupled with the linkage member 124 using mechanical fasteners 213. In the illustrated embodiment of FIG. 2, each of the first and second members 206, 212 is coupled to the linkage member 124 using three mechanical fasteners 213. However, a total number of the mechanical fasteners 213 may vary as per application requirements. Additionally, or alternatively, the first and second members 206, 212 may be coupled with the linkage member 124 by welding.

The mounting system 200 further includes a lateral member 218 disposed proximate to the second end 204 of the mounting system 200. The lateral member 218 extends between the first member 206 and the second member 212. Further, the lateral member 218 has a generally U-shaped structure. The lateral member 218 is coupled with each of the first member 206 and the second member 212 using a pair of mechanical fasteners 219. In the illustrated embodiment of FIG. 2, the lateral member 218 is coupled to each of the first and second members 206, 212 using two mechanical fasteners 219. However, a total number of the mechanical fasteners 219 may vary as per application requirements.

The mounting system 200 further includes a bracket assembly 222 extending between the first member 206 and the second member 212 proximate to the first end 202 of the mounting system 200. The bracket assembly 222 is disposable at a number of locations along the vertical axis "A1" based on a removable coupling of the bracket assembly 222 with each of the first member 206 and the second member 212. Further, the bracket assembly 222 defines a second height "H2". In the illustrated embodiment of FIG. 2, the first height "H1" is greater than the second height "H2".

The bracket assembly 222 includes a first bracket 224 having a first vertical member 226 and a second vertical member 228. Each of the first and second vertical members 226, 228 are spaced apart from each other along the lateral axis "A2". The first vertical member 226 is removably coupled with the first member 206. The second vertical member 228 is removably coupled with the second member 212. The first vertical member 226 includes a number of first through-holes 230 (shown in FIG. 5). In the illustrated embodiment of FIG. 2, the first vertical member 226 includes two rows of first through-holes 230 disposed adjacent to each other along the longitudinal axis "A3". Each first through-hole 230 is in alignment with a corresponding first opening 208 in the first member 206.

Figure 5:
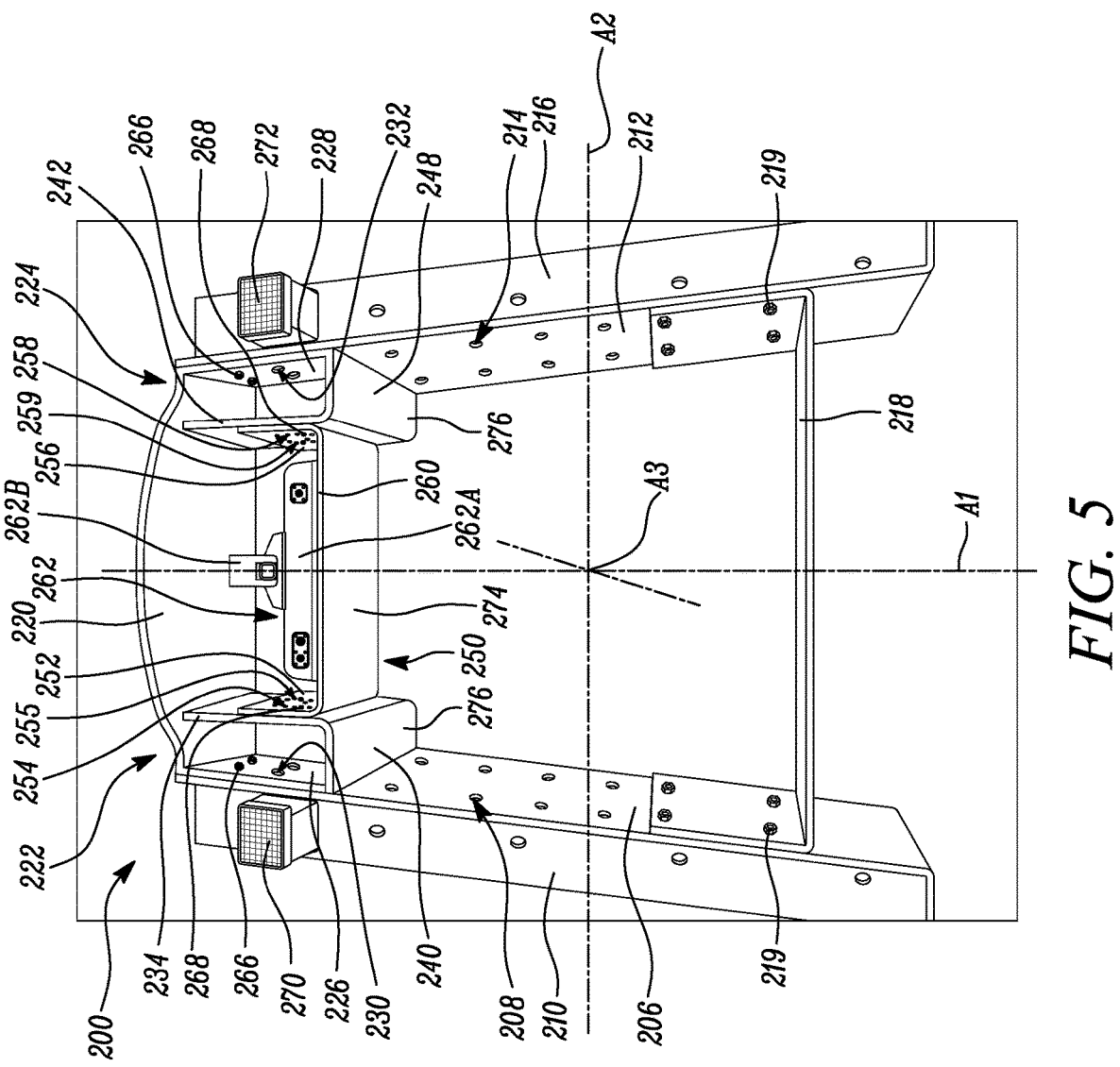
FIG. 5 is a perspective view of the mounting system of FIG. 2.

Further, the second vertical member 228 includes a number of second through-holes 232 (shown in FIG. 5). In the illustrated embodiment of FIG. 2, the second vertical member 228 includes two rows of second through-holes 232 disposed adjacent to each other along the longitudinal axis "A3". Each second through-hole 232 is in alignment with a corresponding second opening 214 in the second member 212. The first and second vertical members 226, 228 are embodied as rectangular plates herein.

The first bracket 224 also includes a lateral member 220 disposed proximate to the first end 202 of the mounting system 200. The lateral member 220 extends between the first and second vertical members 226, 228. Further, the lateral member 220 is coupled with each of the first and second vertical members 226, 228.

The bracket assembly 222 also includes a first mounting plate 234 spaced apart from the first member 206 along the lateral axis "A2". The first mounting plate 234 is also spaced apart from the first vertical member 226 such that the first vertical member 226 is disposed between the first member 206 and the first mounting plate 234. Further, the first mounting plate 234 includes a number of first through-apertures 236, 237. The first through-apertures 236 are arranged in an arcuate shape and are angularly spaced apart from each other. Further, the first through-apertures 237 are arranged in an arcuate shape and are angularly spaced apart from each other. Furthermore, the bracket assembly 222 includes a first horizontal plate 240 extending between the first vertical member 226 and the first mounting plate 234. The first vertical member 226, the first mounting plate 234, and the first horizontal plate 240 together define a U-shaped structure.

The bracket assembly 222 also includes a second mounting plate 242 spaced apart from the second member 212 along the lateral axis "A2". The second mounting plate 242 is also spaced apart from the second vertical member 228 such that the second vertical member 228 is disposed between the second member 212 and the second mounting plate 242. Further, the second mounting plate 242 includes a number of second through-apertures 244, 245. The second through-apertures 244 are arranged in an arcuate shape and are angularly spaced apart from each other. Further, the second through-apertures 245 are arranged in an arcuate shape and are angularly spaced apart from each other. Furthermore, the bracket assembly 222 includes a second horizontal plate 248 extending between the second vertical member 228 and the second mounting plate 242. The second vertical member 228, the second mounting plate 242, and the second horizontal plate 248 together define a U-shaped structure.

The bracket assembly 222 further includes a second bracket 250 extending between the first mounting plate 234 and the second mounting plate 242. The second bracket 250 is removably coupled with the first mounting plate 234 and the second mounting plate 242. The second bracket 250 includes a substantially U-shaped structure. The second bracket 250 includes a third mounting plate 252 (shown in FIG. 5) that is removably coupled with the first mounting plate 234. Further, the third mounting plate 252 includes a number of third through-apertures 254, 255 (shown in FIG. 5). The third through-apertures 254 are arranged in an arcuate shape and are angularly spaced apart from each other. Further, the third through-apertures 255 are arranged in an arcuate shape and are angularly spaced apart from each other. Furthermore, each third through-aperture 254, 255 is in alignment with a corresponding first through-aperture 236, 237 in the first mounting plate 234.

The second bracket 250 also includes a fourth mounting plate 256 that is removably coupled with the second mounting plate 242. Further, the fourth mounting plate 256 includes a number of fourth through-apertures 258, 259 (shown in FIG. 5). The fourth through-apertures 258 are arranged in an arcuate shape and are angularly spaced apart from each other. Further, the fourth through-apertures 259 are arranged in an arcuate shape and are angularly spaced apart from each other. Furthermore, each fourth through-aperture 258, 259 is in alignment with a corresponding second through-aperture 244, 245 in the second mounting plate 242. The second bracket 250 further includes a fifth mounting plate 260 extending between and coupled with the third and fourth mounting plates 252, 256.

Further, the mounting system 200 includes an imaging device 262 coupled with the bracket assembly 222. The imaging device 262 may include a single imaging or multiple imaging devices. Further, the imaging device 262 may include any image capturing device that generates still images or videos, without any limitations. In the illustrated embodiment of FIG. 2, the imaging device 262 includes a digital camera 262A and an infrared camera 262B. In some examples, the infrared camera 262B may be mounted on top of the digital camera 262A via a bracket (not shown).

Further, a position of the imaging device 262 is adjustable with respect to the lateral axis "A2" of the mounting system 200 and/or the vertical axis "A1", such that one or more portions of the work implement 130 (see FIG. 1) of the work machine 100 lies in a field of view of the imaging device 262. The one or more portions of the work implement 130 may include any region of interest of the work implement 130, such as, the ground engaging elements 132 (see FIG. 1). As used throughout this disclosure, the term "field of view" refers to a total area that the imaging device 262 is capable of viewing in three dimensions.

Figure 3:
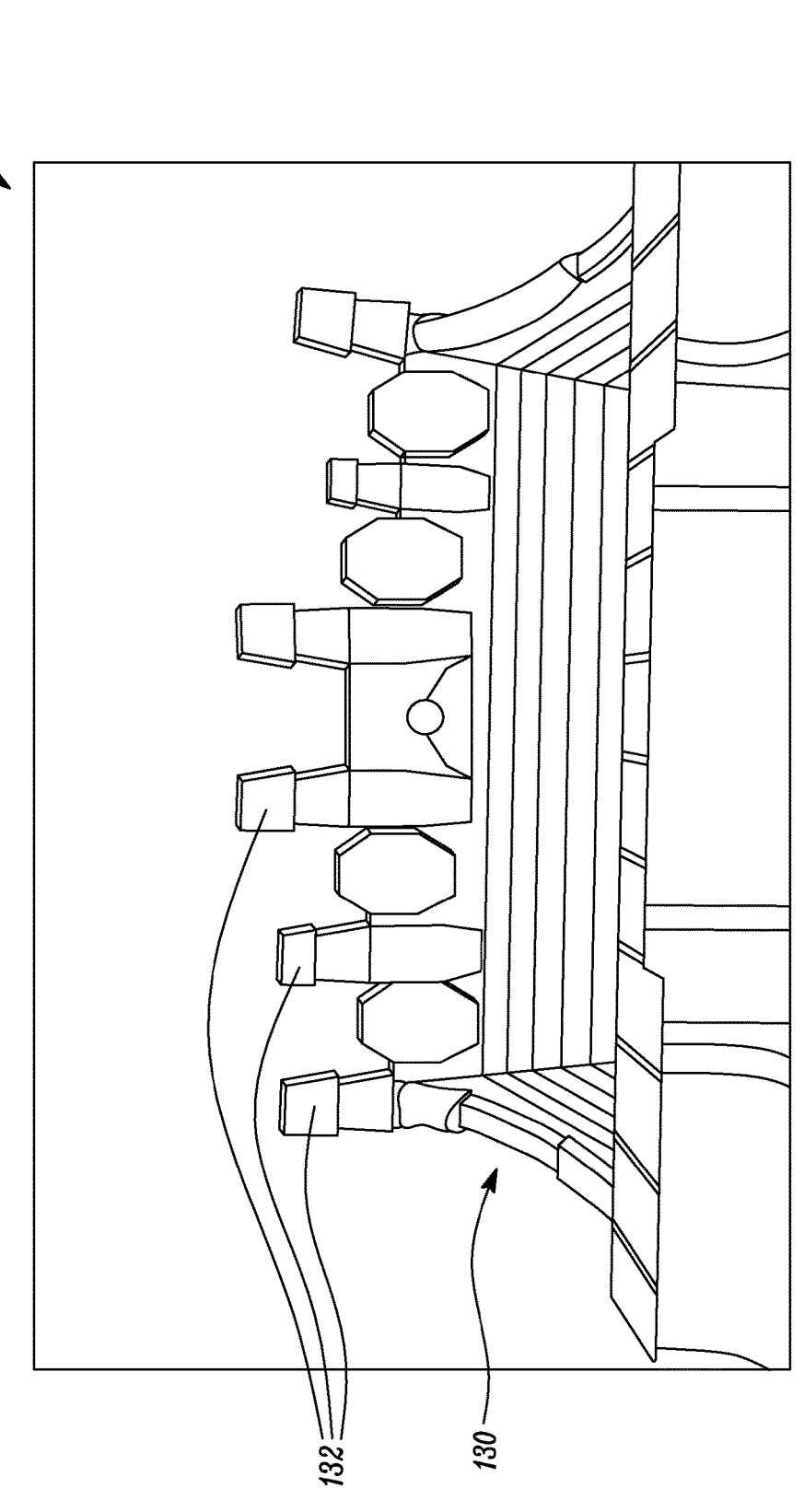
FIG. 3 illustrates an image generated by an imaging device associated with the mounting system of FIG. 2.

FIG. 3 illustrates the exemplary image 264 as generated by the imaging device 262. As shown in FIG. 3, based on an adjustment of the position of the imaging device 262, the image 264 containing the region of interest of the work implement 130 may be captured by the imaging device 262. The region of interest is depicted as the ground engaging elements 132 herein. However, the region of interest may vary and may include any other portion of the work implement 130, as per application requirements.

Referring again to FIG. 2, the imaging device 262 is coupled with the second bracket 250. Specifically, the imaging device 262 is coupled to and rests on the fifth mounting plate 260 of the second bracket 250. The second bracket 250 is removably coupled with the first mounting plate 234 and the second mounting plate 242 for adjusting a position of the imaging device 262 with respect to the lateral axis "A2" and/or the vertical axis "A1". In order to adjust the position of the imaging device 262 with respect to the vertical axis "A1", the first and second vertical members 226, 228 may be removably coupled with the first and second members 206, 212, respectively. For example, the first and second vertical members 226, 228 may be coupled to the first and second members 206, 212 such that the bracket assembly 222 is disposed proximate to the lateral member 220 (as depicted herein). Alternatively, the first and second vertical members 226, 228 may be coupled to the first and second members 206, 212 such that the bracket assembly 222 is disposed proximate to the lateral member 218.

In the illustrated embodiment of FIG. 2, the first and second vertical members 226, 228 are coupled to the first and second members 206, 212 using a pair of first mechanical fasteners 266. More particularly, two first openings 208 in the first member 206 may align with two corresponding first through-holes 230 (see FIG. 5) in the first vertical member 226 for receiving two first mechanical fasteners 266 that couple the first vertical member 226 with the first member 206. Further, two second openings 214 in the second member 212 may align with two corresponding second through-holes 232 (see FIG. 5) in the second vertical member 228 for receiving two first mechanical fasteners 266 (see FIG. 5) that couple the second vertical member 228 with the second member 212. The first mechanical fasteners 266 may include bolts, screws, pins, dowels, and the like.

In some examples, the second bracket 250 may be removably coupled with the first and second mounting plates 234, 242 for adjusting the position of the imaging device 262 with respect to the vertical axis "A1", such that the fifth mounting plate 260 is substantially perpendicular to the vertical axis "A1" (as illustrated in FIG. 2). For example, the third and fourth mounting plates 252, 256 may be coupled to the first and second mounting plates 234, 242, respectively, such that the imaging device 262 is disposed proximate to the lateral member 220. Alternatively, the third and fourth mounting plates 252, 256 may be coupled to the first and second mounting plates 234, 242, respectively, such that the imaging device 262 is disposed proximate to the lateral member 218.

In the illustrated embodiment of FIG. 2, the third and fourth mounting plates 252, 256 are coupled to the first and second mounting plates 234, 242 using a pair of second mechanical fasteners 268. More particularly, two first through-apertures 236, 237 in the first mounting plate 234 may align with two corresponding third through-apertures 254, 255 (see FIG. 5) in the third mounting plate 252 for receiving two second mechanical fasteners 268 that couple the first mounting plate 234 with the third mounting plate 252. Further, two second through-apertures 244, 245 in the second mounting plate 242 may align with two corresponding fourth through-apertures 258, 259 (see FIG. 5) in the fourth mounting plate 256 for receiving two second mechanical fasteners 268 (see FIG. that couple the second mounting plate 242 with the fourth mounting plate 256. The second mechanical fasteners 268 may include bolts, screws, pins, dowels, and the like.

Figure 4:
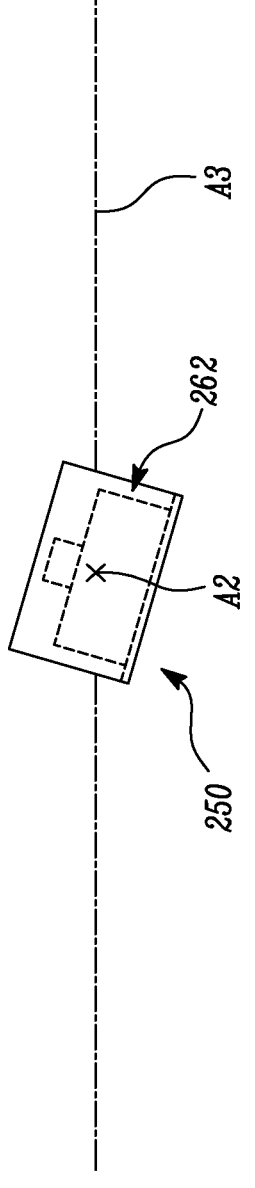
FIG. 4 is a schematic side view of the mounting system including a second bracket and the imaging device, according to an embodiment of the present disclosure.

Referring now to FIG. 4, in another example, the second bracket 250 may be removably coupled with the first and second mounting plates 234, 242 (see FIG. 2) for adjusting the position of the imaging device 262 with respect to the lateral axis "A2", such that the imaging device 262 is angularly disposed relative to the lateral axis "A2". In other words, the second bracket 250 may be removably coupled with the first and second mounting plates 234, 242 such that the imaging device 262 is disposed at an angle relative to the lateral axis "A2". Such a configuration of the second bracket 250 may allow the second bracket 250 to be adjusted with respect to the lateral axis "A2" to adjust a pitch angle of the imaging device 262. In such a configuration, the first through-aperture 236, 237 (see FIG. 2) in the first mounting plate 234 may align with a corresponding third through-aperture 254, 255 (see FIG. 5) in the third mounting plate 252 (see FIG. 5) for receiving the second mechanical fasteners 268 (see FIG. 5) that couple the first mounting plate 234 with the third mounting plate 252. It should be noted that, in such configurations, the first through-aperture 236 in which the second mechanical fastener 268 is received will be offset rather than being disposed adjacent to the first through-aperture 237 to facilitate a tilting of the imaging device 262. Moreover, the third through-aperture 254 in which the second mechanical fastener 268 is received will be offset rather than being disposed adjacent to the third through-aperture 255 to facilitate the tilting of the imaging device 262.

Additionally, the second through-aperture 244, 245 in the second mounting plate 242 may align with a corresponding fourth through-aperture 258, 259 (see FIG. 5) in the fourth mounting plate 256 (see FIG. 5) for receiving the second mechanical fasteners 268 (see FIG. 5) that couple the second mounting plate 242 with the fourth mounting plate 256. It should be noted that, in such configurations, the second through-aperture 244 in which the second mechanical fastener 268 is received will be offset rather than being disposed adjacent to the second through-aperture 245 to facilitate the tilting of the imaging device 262. Moreover, the fourth through-aperture 258 in which the second mechanical fastener 268 is received will be offset rather than being disposed adjacent to the fourth through-aperture 259 to facilitate the tilting of the imaging device 262.

In some examples, it may be contemplated that the second bracket 250 may be adjusted with respect to the longitudinal axis "A3" to adjust a roll angle of the imaging device 262. Moreover, it may be contemplated that the second bracket 250 may be adjusted with respect to the vertical axis "A1" to adjust a yaw angle of the imaging device 262.

As shown in FIG. 5, in some examples, the mounting system 200 further includes one or more lighting devices 270, 272 to illuminate the one or more portions of the work implement 130 (see FIG. 1). Further, a position of the one or more lighting devices 270, 272 may be adjustable relative to the first member 206, the second member 212, and/or the bracket assembly 222. It should be noted that the lighting devices 270, 272 are not depicted in FIG. 2 for the sake of clarity. In some examples, each lighting device 270, 272 may be coupled to the first member 206, the second member 212, and/or the bracket assembly 222 using a connecting bracket (not shown). In some examples, the connecting bracket may be adjustable so that the lighting devices 270, 272 can illuminate the region of interest of the work implement 130.

The lighting devices 270, 272 are coupled proximate to the first end 202 of the mounting system 200. In the illustrated embodiment of FIG. 5, the mounting system 200 includes two lighting devices 270, 272. However, in other embodiments, the mounting system 200 may include any number of the lighting devices 270, 272. In the illustrated embodiment of FIG. 5, the lighting devices 270, 272 are coupled to the first and second members 206, 212, respectively. In other examples, the one or more lighting devices 270, 272 may be removably coupled with the bracket assembly 222. For example, the lighting devices 270, 272 may be coupled to an underside 274 of the second bracket 250. In another example, the lighting devices 270, 272 may be coupled to an underside 276 of the first and second horizontal plates 240, 248. In yet another example, the lighting devices 270 may be coupled to the first vertical member 226 or the first mounting plate 234 and the lighting device 272 may be coupled to the second vertical member 228 or the second mounting plate 242. It should be noted that the lighting devices 270, 272 may include any known in the art lighting element including, but not limited to, light emitting diodes. The lighting devices 270, 272 may be battery operated, without any limitations.

Figure 6:
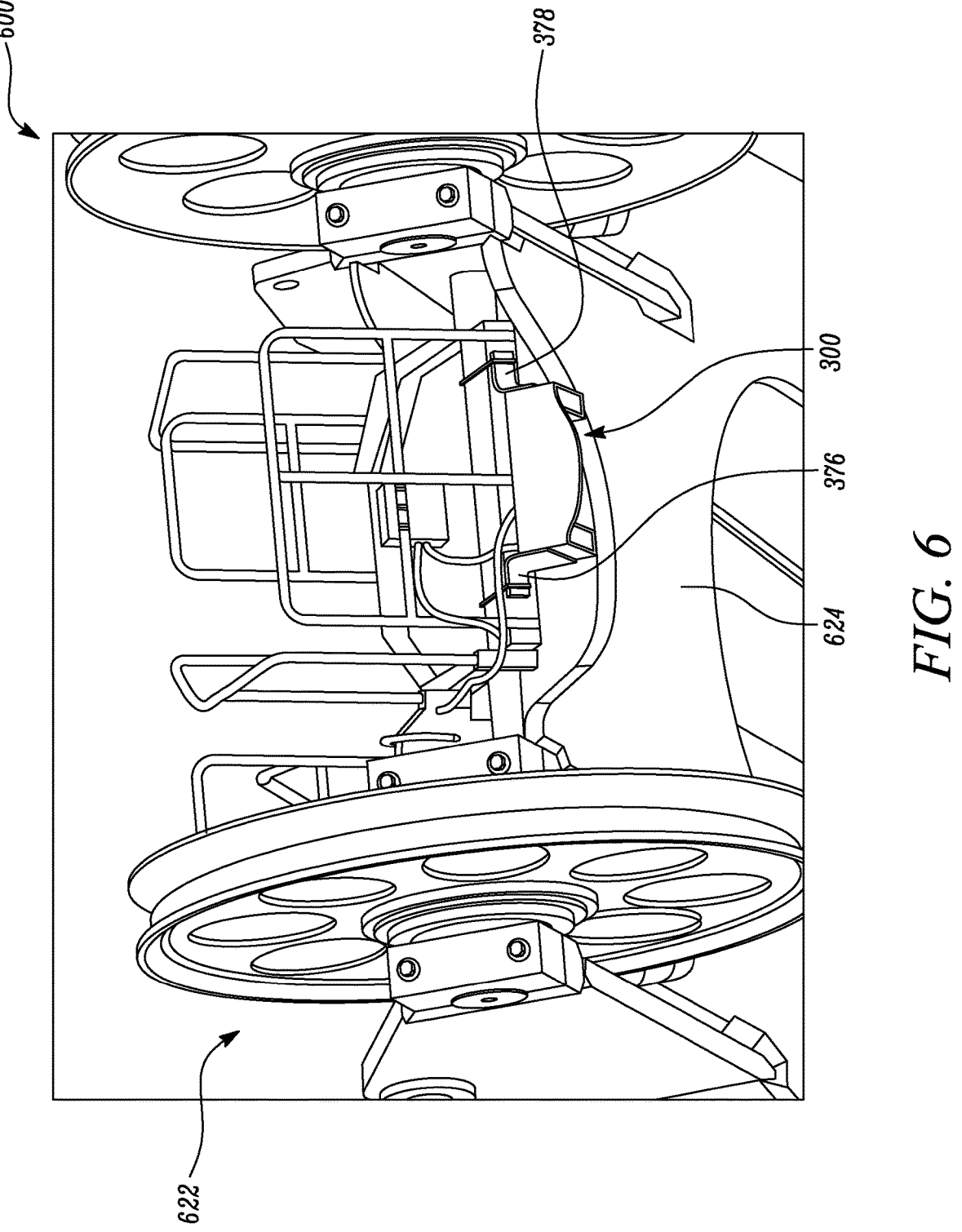
FIG. 6 is a perspective view of a portion of a work machine including a mounting system, according to another embodiment of the present disclosure.

Referring to FIG. 6, a perspective view of a portion of another work machine 600 is illustrated. The work machine 600 is embodied as a rope shovel herein. The work machine 600 may include a work implement (not shown), such as, a bucket. Further, the work machine 600 includes a linkage assembly 622 and a linkage member 624 associated with the linkage assembly 622. The linkage member 624 is embodied as a boom herein. As illustrated in FIG. 6, the work machine 600 includes a mounting system 300. The mounting system 300 is coupled to the linkage member 624 of the work machine 600.

Figure 7:
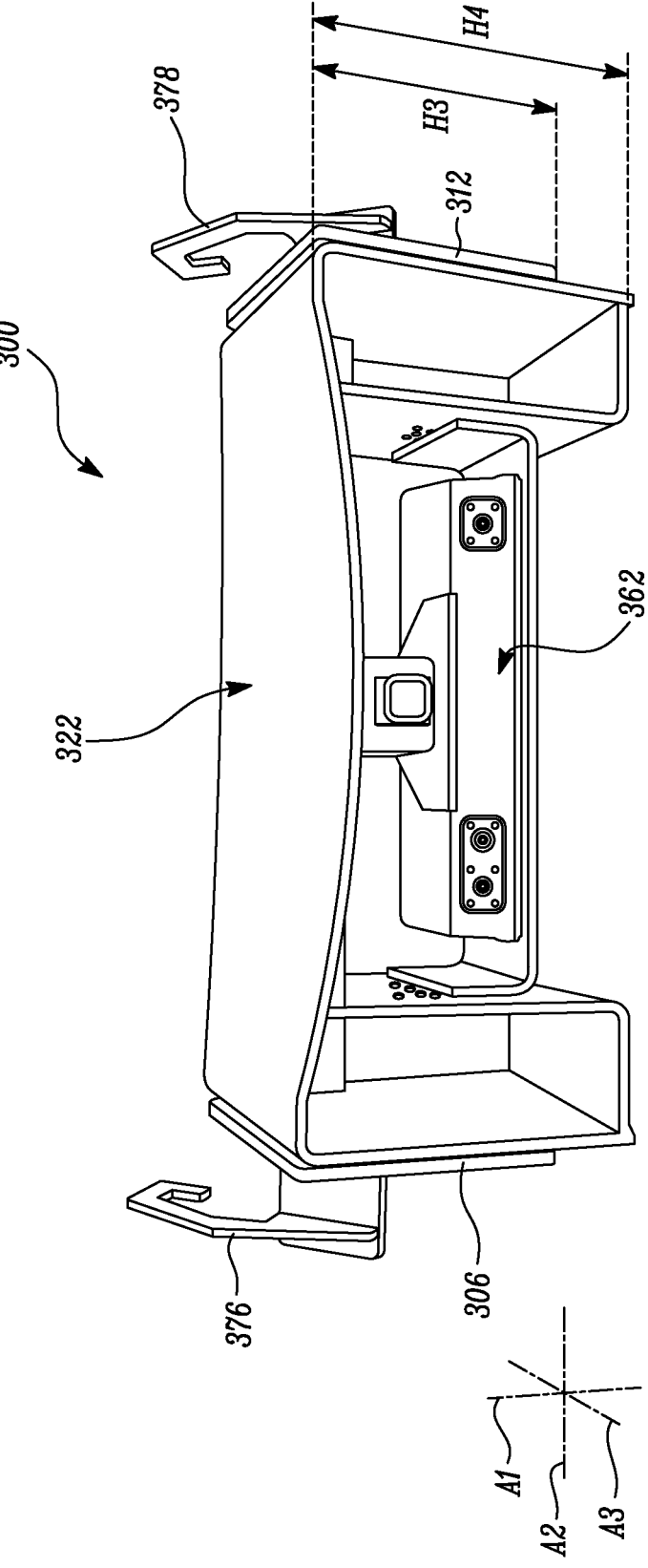
FIG. 7 is a perspective view of the mounting system of FIG. 6.

Referring to FIG. 7, a perspective view of the mounting system 300 is illustrated. The mounting system 300 is substantially similar to the mounting system 200 illustrated and explained in reference to FIGS. 2 and 5, in terms of functionality and design. The mounting system 300 includes a first member 306 and a second member 312. The first and second members 306, 312 are substantially similar to the first and second members 206, 212 (see FIG. 2) associated with the mounting system 200 of FIG. 2. The mounting system 300 includes a first connecting bracket 376 and a second connecting bracket 378. The first connecting bracket 376 is coupled to the first member 306 and the second connecting bracket 378 is coupled to the second member 312. The first and second connecting brackets 376, 378 allow coupling of the mounting system 300 with the linkage member 624 (see FIG. 6). The first and second connecting brackets 376, 378 may attach with a portion of the linkage member 624. In some examples, the mounting system 300 may be coupled to the linkage member 624 at the first and second connecting brackets 376, 378 by welding.

Further, the mounting system 300 includes a bracket assembly 322. The bracket assembly 322 is substantially similar to the bracket assembly 222 (see FIG. 2) associated with the mounting system 200. Further, each of the first member 306 and the second member 312 of the mounting system 300 define a first height "H3" and the bracket assembly 322 of the mounting system 300 defines a second height "H4". In the illustrated embodiment of FIG. 7, the second height "H4" is greater than the first height "H3".

The mounting system 300 also includes an imaging device 362 that is substantially similar to the imaging device 262 (see FIG. 2). It should be noted that details related to the adjustment of the bracket assembly 222, and more specifically, the imaging device 262 (see FIG. 2) with respect to the lateral axis "A2" and the vertical axis "A1" is equally applicable to an adjustment of the bracket assembly 322, and more specifically, the imaging device 362 with respect to the lateral axis "A2" and the vertical axis "A1". More particularly, the bracket assembly 322 may disposed at various locations along the vertical axis "A1". Further, the bracket assembly 322 may be adjustable with respect to the lateral axis "A2" to adjust a yaw angle of the imaging device 362. In some examples, it may be contemplated that the bracket assembly 322 may be adjusted with respect to the longitudinal axis "A3" to adjust a roll angle of the imaging device 362. Moreover, it may be contemplated that the bracket assembly 322 may be adjusted with respect to the vertical axis "A1" to adjust a yaw angle of the imaging device 362.

Figure 8:
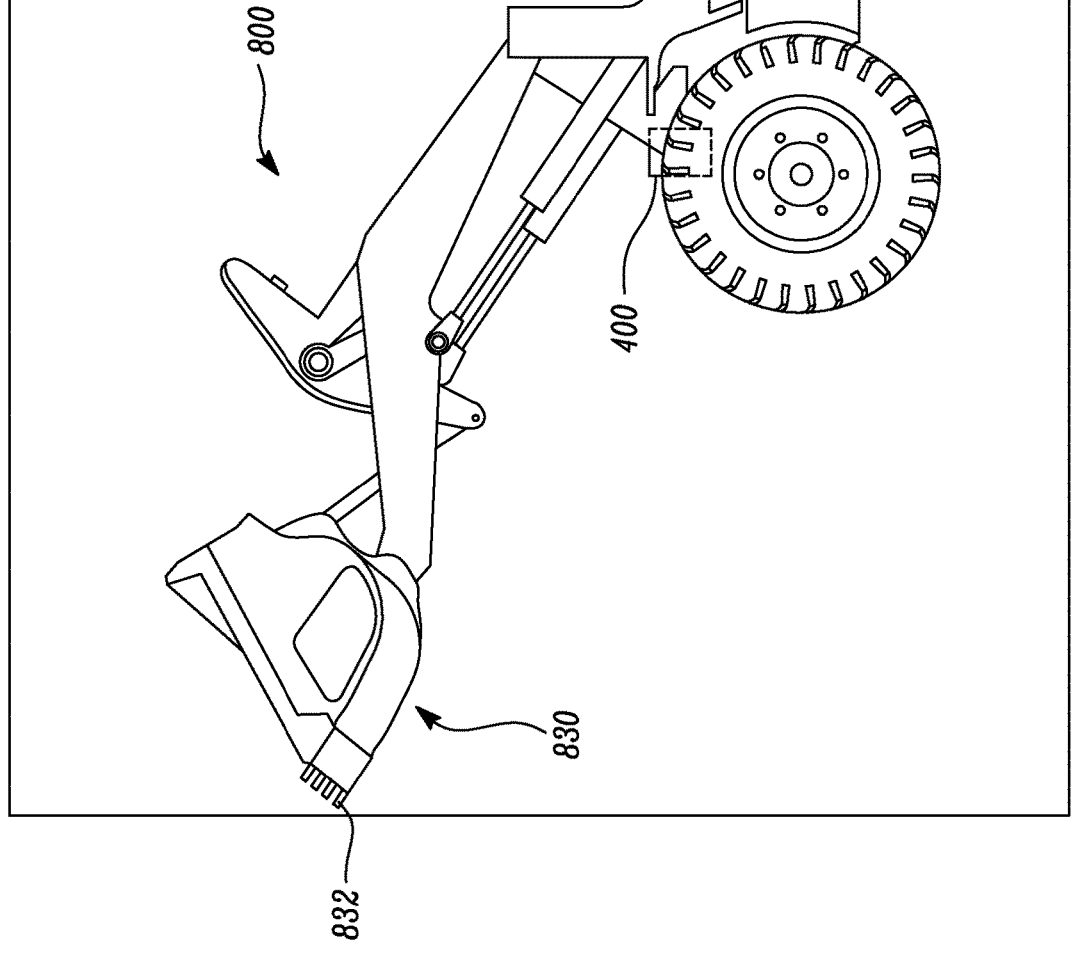
FIG. 8 is a schematic side view of a portion of a work machine including a mounting system, according to yet another embodiment of the present disclosure.

Referring now to FIG. 8, a schematic side view of yet another work machine 800 is illustrated. In the illustrated embodiment of FIG. 8, the work machine 800 is embodied as a wheel loader. The work machine 800 includes a linkage member 824 and a work implement 830 movably coupled to the linkage member 824. The work implement 830 includes a number of ground engaging elements 832. The work implement 830 is embodied as a bucket herein. As illustrated in FIG. 8, the work machine 800 includes a mounting system 400. The mounting system 400 is coupled to the linkage member 824.

Figure 9:
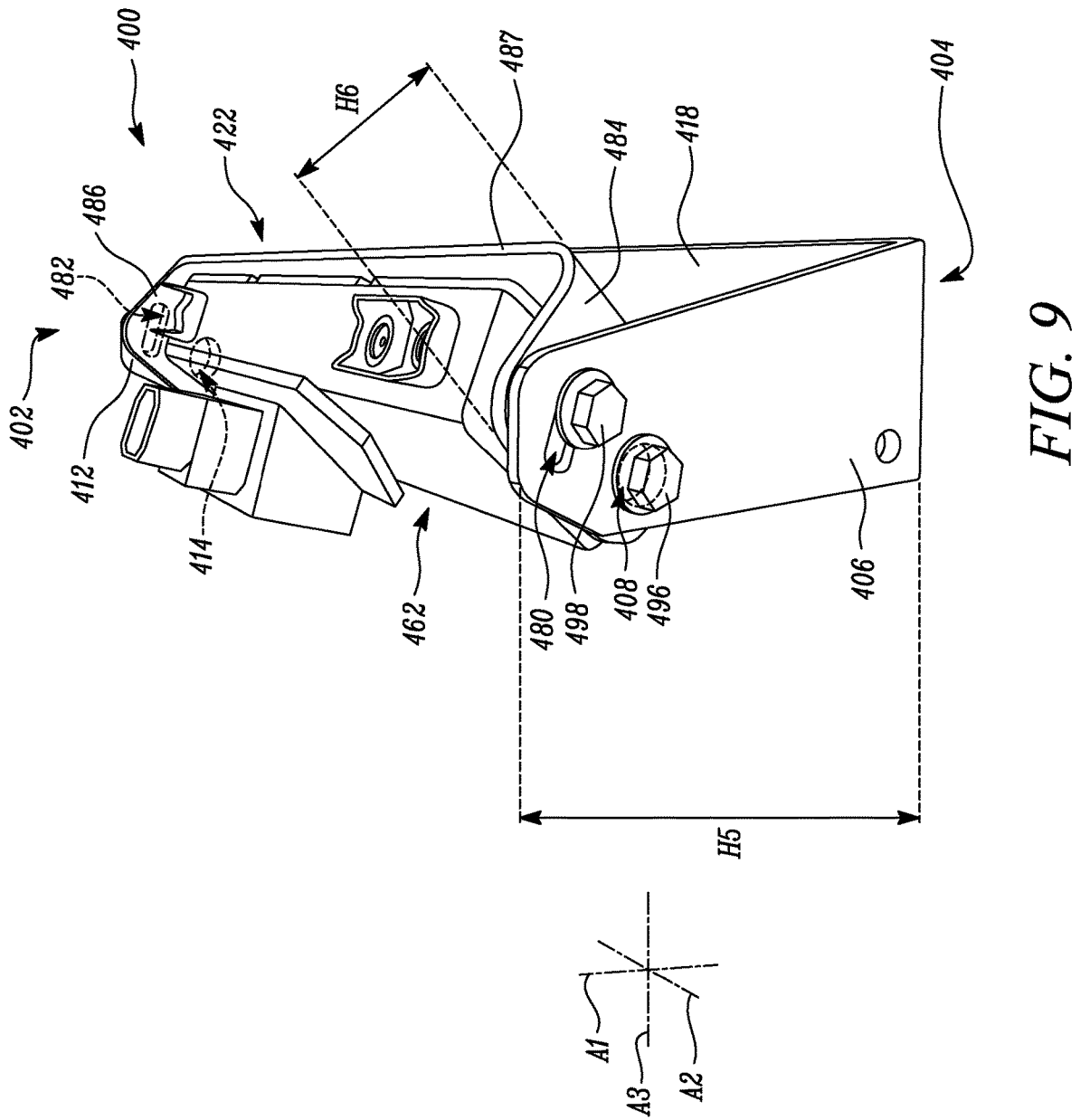
FIG. 9 is a perspective view of the mounting system of FIG. 8.

Referring to FIG. 9, a perspective view of the mounting system 400 is illustrated. The mounting system 400 is substantially similar to the mounting system 200 illustrated and explained in relation to FIGS. 2 and 5, in terms of functionality and design. The mounting system 400 includes a first member 406 and a second member 412. The first and second members 406, 412 are substantially similar to the first and second members 206, 212 (see FIG. 2) associated with the mounting system 200 of FIG. 2. The first member 406 includes one or more third openings 408 and one or more first slots 480. In the illustrated embodiment of FIG. 9, the first member 406 includes a single third opening 408 and a single first slot 480. Alternatively, the e first member 406 may include two or more third openings and two or more first slots. A total number of the third openings 408 and the first slots 480 may vary based on dimensions of the first member 406. Further, the second member 412 includes one or more fourth openings 414 and one or more second slots 482. In the illustrated embodiment of FIG. 9, the second member 412 includes a single fourth opening 414 and a single second slot 482. Alternatively, the second member 412 may include two or more fourth openings and two or more second slots. A total number of the fourth openings 414 and the second slots 482 may vary based on dimensions of the second member 412.

The first and second slots 480, 482 are substantially oval shaped. Alternatively, the first and second slots 480, 482 are substantially arcuate shaped. Further, each third opening 408 in the first member 406 is in alignment with a corresponding fourth opening 414 in the second member 412. Moreover, each first slot 480 in the first member 406 is in alignment with a corresponding second slot 482 in the second member 412. The mounting system 400 defines a first end 402 and a second end 404. Further, the mounting system 400 defines a lateral member 418 extending between and coupled to the first and second members 406, 412. In the illustrated embodiment of FIG. 9, the lateral member 418 is integral with the first and second members 406, 412. Further, the first member 406, the lateral member 418, and the second member 412 together define a U-shaped structure. The mounting system 400 also includes a bracket assembly 422. Each of the first member 406 and the second member 412 of the mounting system 400 define a first height "H5" and the bracket assembly 422 of the mounting system 400 defines a second height "H6". In the illustrated embodiment of FIG. 9, the first height "H5" is greater than the second height "H6".

The bracket assembly 422 also includes a first plate 484 removably coupled with the first member 406. The bracket assembly 422 further includes a second plate 486 spaced apart from the first plate 484 along the lateral axis "A2". Further, the second plate 486 is removably coupled with the second member 412. The bracket assembly 422 further includes a third plate 487 extending between and coupled with each of the first plate 484 and the second plate 486.

The first plate 484 includes one or more first plate through-holes (not shown) and one or more second plate through-holes (not shown). Each first plate through-hole in the first plate 484 is in alignment with a corresponding third opening 408 in the first member 406 and each second plate through-hole in the first plate 484 is in alignment with a corresponding first slot 480 in the first member 406. Further, the second plate 486 includes one or more third plate through-holes and one or more fourth plate through-holes (not shown). Further, each third plate through-hole in the second plate 486 is in alignment with a corresponding fourth opening 414 in the second member 412 and each fourth plate through-hole in the second plate 486 is in alignment with a corresponding second slot 482 in the second member 412.

In the illustrated embodiment of FIG. 9, the first member 406 is coupled to the first plate 484 using two mechanical fasteners 496, 498. More particularly, the third opening 408 in the first member 406 aligns with the first plate through-hole in the first plate 484 for receiving the mechanical fastener 496 and the first slot 480 in the first member 406 aligns with the second plate through-hole in the first plate 484 for receiving the mechanical fastener 498. Similarly, the second member 412 is coupled to the second plate 486 using two mechanical fasteners (not shown). More particularly, the fourth opening 414 in the second member 412 aligns with the third plate through-hole in the second plate 486 for receiving one of the mechanical fasteners and the second slot 482 in the second member 412 aligns with the fourth plate through-hole in the second plate 486 for receiving another mechanical fastener. The mechanical fasteners 496, 498 may include bolts, screws, pins, dowels, and the like.

The mounting system 400 also includes an imaging device 462 that is substantially similar to the imaging device 262 (see FIG. 2) of the mounting system 200 of FIG. 2. The imaging device 462 is coupled with and rests on the third plate 487. Further, a position of the imaging device 462 is adjustable with respect to the lateral axis "A2" of the mounting system 400, such that one or more portions of the work implement 830 (see FIG. 8) of the work machine 800 lies in a field of view of the imaging device 462. In other words, the bracket assembly 422 may be tilted with respect to the lateral axis "A2", such that the imaging device 462 is angularly disposed relative to the lateral axis "A2". Thus, the bracket assembly 422 may be removably coupled with the first and second members 406, 412 such that the imaging device 462 is disposed at an angle relative to the lateral axis "A2". Such a configuration of the bracket assembly 422 may allow the bracket assembly 422 to be adjusted with respect to the lateral axis "A2" to adjust a pitch angle of the imaging device 462.

The bracket assembly 422 may be tilted based on a coupling location of the mechanical fasteners 498 along the first slot 480 and a coupling location of the mechanical fastener that couples the second plate 486 with the second member 412 along the second slot 482. For example, the mechanical fastener 496, 498 may be slidable within the first slot 480 and tightened at a desired location based on a desired orientation of the imaging device 462. Similarly, the mechanical fastener that couples the second plate 486 with the second member 412 may be slidable within the second slot 482 and tightened at a desired location based on the desired orientation of the imaging device 462. An amount by which the bracket assembly 422 is to be moved may be such that the ground engaging elements 832 (see FIG. 8) of the work implement 830 lie in the field of view of the imaging device 462. In some examples, it may be contemplated to adjust the bracket assembly 422 with respect to the longitudinal axis "A3" to adjust a roll angle of the imaging device 462. Moreover, it may be contemplated to adjust the bracket assembly 422 with respect to the vertical axis "A1" to adjust a yaw angle of the imaging device 462.

Further, in some examples, a position of the imaging device 462 may be adjustable with respect to the vertical axis "A1", such that one or more portions of the work implement 830 of the work machine 800 lies in a field of view of the imaging device 462. In such configurations, the first member 406 may include two or more third openings (similar to the third opening 408) and two or more first slots (similar to the first slot 480). Moreover, the second member 412 may include two or more fourth openings (similar to the fourth opening 414) and two or more second slots (similar to the second slot 482). Further, in order to adjust the position of the imaging device 462 with respect to the vertical axis "A1", the first and second plates 484, 486 may be removably coupled with the first and second members 406, 412, respectively. For example, the first and second plates 484, 486 may be coupled to the first and second members 406, 412 such that the bracket assembly 422 is disposed closer to the first end 402 of the mounting system 400. Alternatively, the first and second plates 484, 486 may be coupled to the first and second members 406, 412 such that the bracket assembly 422 is disposed closer to the lateral member 418.

INDUSTRIAL APPLICABILITY

The present disclosure relates to the mounting system 200, 300, 400 associated with the work machine 100, 600, 800. The mounting system 200, 300, 400 includes the bracket assembly 222, 322, 422 and the imaging device 262, 362, 462 coupled to the bracket assembly 222, 322, 422. The mounting system 200, 300, 400 may be used as a stand-alone system to determine or inspect a condition of the work implement 130, 830. For example, the mounting system 200, 300, 400 may be sued to determine an extent of wear of the ground engaging elements 132, 832 of the work implement 130, 830. Alternatively, the mounting system 200, 300, 400 may form a part of an automated monitoring system for determining the condition of the work implement 130, 830.

The bracket assembly 222, 322, 422 can be disposed at any desired position along the vertical axis "A1" of the mounting system 200, 300, 400. The mounting system 200, 300, 400 may improve an accuracy with which the work implement 130, 830 may be inspected. Specifically, the mounting system 200, 300, 400 is designed such that the imaging device 262, 362, 462 may be adjusted with respect to the lateral axis "A2" and/or the vertical axis "A1", so that the imaging device 262, 362, 462 can be positioned in a desired orientation. An accurate orientation of the imaging device 262, 362, 462 may ensure that the region of interest of the work implement 130, 830 lies in the field of view of the imaging device 262, 362, 462, thereby improving monitoring/inspection of the work implement 130, 830. Furthermore, the mounting system 200, 300, 400 may improve a confidence of an inspector/operator and may also reduce a scope of errors while inspecting the work implement 130, 830. Moreover, as the mounting system 200, 300, 400 may be disposed in different orientations, it may be possible to capture images of the ground engaging elements 132, 832 from various perspectives. Accordingly, the ground engaging elements 132, 832 or any other portion of the work implement 130, 830 may be thoroughly analyzed.

Further, the mounting system 200, 300, 400 may be embodied as a modular mounting system that may be coupled with various work machines. The mounting system 200, 300, 400 may be embodied as an aftermarket kit that may be used to monitor various work implements. Further, the mounting system 200, 300, 400 including the imaging device 262, 362, 462 may be retrofitted on existing work machines with minimum modifications. Moreover, the mounting system 200, 300, 400 may be cost-effective to incorporate in various work machines. It should be further noted that dimensions of the mounting system 200, 300, 400 may be varied as per dimensions of the work machine on which the mounting system 200, 300, 400 is being installed.

While aspects of the present disclosure have been particularly shown and described with reference to the embodiments above, it will be understood by those skilled in the art that various additional embodiments may be contemplated by the modification of the disclosed work machines, systems and methods without departing from the spirit and scope of the disclosure. Such embodiments should be understood to fall within the scope of the present disclosure as determined based upon the claims and any equivalents thereof.

What is claimed is:

1. A mounting system for a work machine, the mounting system comprising:
    a first member extending along a vertical axis of the mounting system;
    a second member extending along the vertical axis and spaced apart from the first member along a lateral axis of the mounting system;
    a bracket assembly, extending between the first member and the second member, proximate to a first end of the mounting system, wherein the bracket assembly is removably coupled to the first member and the second member at a plurality of locations, of each of the first member and the second member, along the vertical axis, wherein each of the plurality of locations defines a different height of the bracket assembly; and
    an imaging device coupled with the bracket assembly, wherein a position of the imaging device is adjustable with respect to the lateral axis and the vertical axis, such that at least one portion of a work implement of the work machine lies in a field of view of the imaging device.

2. The mounting system of claim 1, wherein the bracket assembly includes:
    a first bracket having a first vertical member and a second vertical member, wherein each of the first and second vertical members are spaced apart from each other along the lateral axis, wherein the first vertical member is removably coupled with the first member, and wherein the second vertical member is removably coupled with the second member;
    a first mounting plate spaced apart from the first member along the lateral axis;
    a second mounting plate spaced apart from the second member along the lateral axis; and a second bracket extending between the first mounting plate and the second mounting plate, wherein the imaging device is coupled with the second bracket, and wherein the second bracket is removably coupled with the first mounting plate and the second mounting plate for adjusting the position of the imaging device with respect to at least one of the lateral axis and the vertical axis.

3. The mounting system of claim 1, wherein each of the first member and the second member define a first height, and wherein the different height of the bracket assembly is a second height, wherein the first height is greater than the second height.

4. The mounting system of claim 1, wherein the bracket assembly includes:
    a first plate adapted to be removably coupled with the first member;
    a second plate spaced apart from the first plate along the lateral axis, wherein the second plate is adapted to be removably coupled with the second member; and
    a third plate extending between and coupled with each of the first plate and the second plate, wherein the imaging device is coupled with the third plate.

5. The mounting system of claim 1, further comprising a lateral member disposed proximate to a second end of the mounting system, the second end being opposite to the first end, wherein the lateral member is coupled with each of the first member and the second member.

6. The mounting system of claim 1, further comprising at least one lighting device adapted to illuminate the at least one portion of the work implement.

7. The mounting system of claim 6, wherein a position of the at least one lighting device is adjustable relative to the bracket assembly.

8. The mounting system of claim 1, wherein each of the first and second members is coupled with a linkage member associated with the work implement.

9. The mounting system of claim 1, wherein the plurality of locations, of each of the first member and the second member, comprises:
    a plurality of first openings, of the first member, linearly spaced apart from each other along the vertical axis, and
    a plurality of second openings, of the second member, linearly spaced apart from each other along the vertical axis,
        wherein each first opening in the first member is in alignment with a corresponding second opening in the second member.

10. The mounting system of claim 1, wherein the first member includes a first opening and a first slot, wherein the second member includes a second opening and a second slot, wherein the first opening in the first member is in alignment with the second opening in the second member, and wherein the first slot in the first member is in alignment with the second slot in the second member.

11. The mounting system of claim 1, wherein each of the plurality of locations defines the different height of the bracket assembly independent from a rotation of the bracket assembly.

12. The mounting system of claim 5, wherein the lateral member extends between sides of the first member and the second member, and wherein the lateral member is directly below the bracket assembly.

13. A work machine comprising:
    a frame;

a linkage assembly coupled with the frame, the linkage assembly including a linkage member;

a work implement movably coupled with the linkage assembly; and a mounting system coupled with the linkage member, the mounting system including:

a first member extending along a vertical axis of the mounting system;

a second member extending along the vertical axis and spaced apart from the first member along a lateral axis of the mounting system;

a bracket assembly, extending between the first member and the second member, proximate to a first end of the mounting system and comprising a first bracket and a second bracket supported by and laterally offset from the first bracket, wherein the bracket assembly is disposable at a plurality of locations, of each of the first member and the second member, along the vertical axis, wherein each of the plurality of locations defines a different height of the bracket assembly; and an imaging device coupled to the second bracket, wherein a position of the imaging device is adjustable with respect to at least one of the lateral axis and the vertical axis, such that at least one portion of the work implement of the work machine lies in a field of view of the imaging device.

14. The work machine of claim 13, wherein the bracket assembly further comprises a first mounting plate and a second mounting plate, wherein:

the first bracket has a first vertical member and a second vertical member, wherein each of the first and second vertical members are spaced apart from each other along the lateral axis, wherein the first vertical member is removably coupled with the first member, and wherein the second vertical member is removably coupled with the second member;

the first mounting plate is spaced apart from the first member along the lateral axis;

the second mounting plate is spaced apart from the second member along the lateral axis; and the second bracket extends between the first mounting plate and the second mounting plate, wherein the second bracket is removably coupled with the first mounting plate and the second mounting plate for adjusting the position of the imaging device with respect to at least one of the lateral axis and the vertical axis.

15. The work machine of claim 13, wherein each of the first member and the second member defines a first height, wherein the different height of the bracket assembly is a second height, and wherein the first height is greater than the second height.

16. The work machine of claim 13, wherein the bracket assembly includes:

a first plate adapted to be removably coupled with the first member;

a second plate spaced apart from the first plate along the lateral axis, wherein the second plate is adapted to be removably coupled with the second member; and a third plate extending between and coupled with each of the first plate and the second plate, wherein the imaging device is coupled with the third plate.

17. The work machine of claim 13, further comprising a lateral member disposed proximate to a second end of the mounting system, the second end being opposite to the first end, wherein the lateral member is coupled with each of the first member and the second member.

18. The work machine of claim 13, further comprising at least one lighting device adapted to illuminate the at least one portion of the work implement.

19. The work machine of claim 13, wherein the plurality of locations, of each of the first member and the second member, comprises a plurality of first openings, of the first member, linearly spaced apart from each other along the vertical axis, and a plurality of second openings, of the second member, linearly spaced apart from each other along the vertical axis, wherein each first opening in the first member is in alignment with a corresponding second opening in the second member.

20. The work machine of claim 13, wherein the first member includes a first opening and a first slot, wherein the second member includes a second opening and a second slot, wherein the first opening in the first member is in alignment with the second opening in the second member, and wherein the first slot in the first member is in alignment with the second slot in the second member.

* * * * *